W. H. MARTIN.
ADJUSTABLE HEADLIGHT FOR MOTOR VEHICLES.
APPLICATION FILED APR. 24, 1914.
1,120,154.  Patented Dec. 8, 1914.
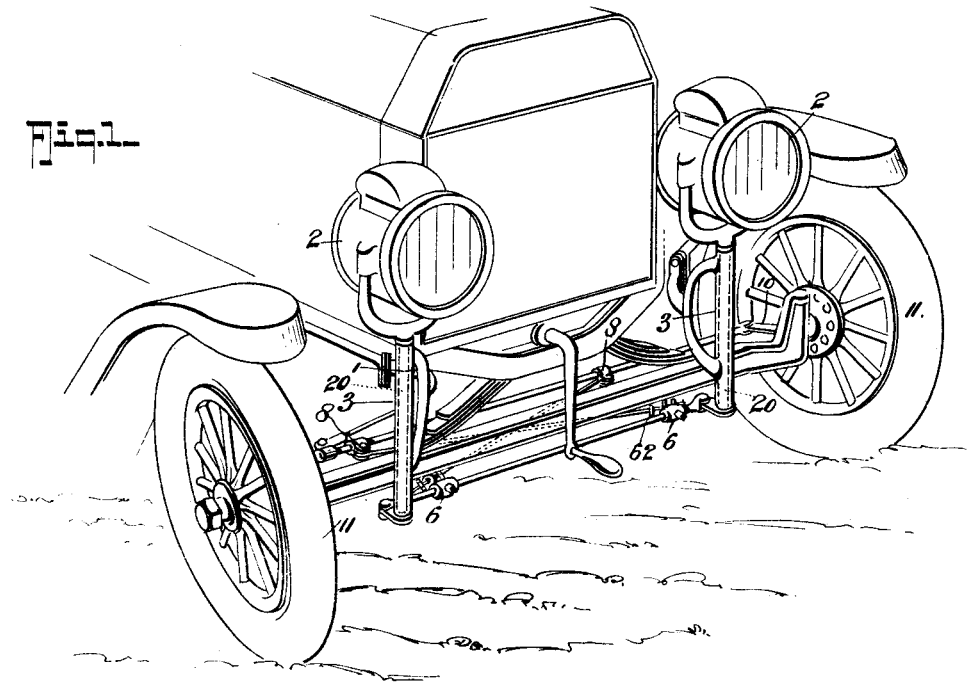
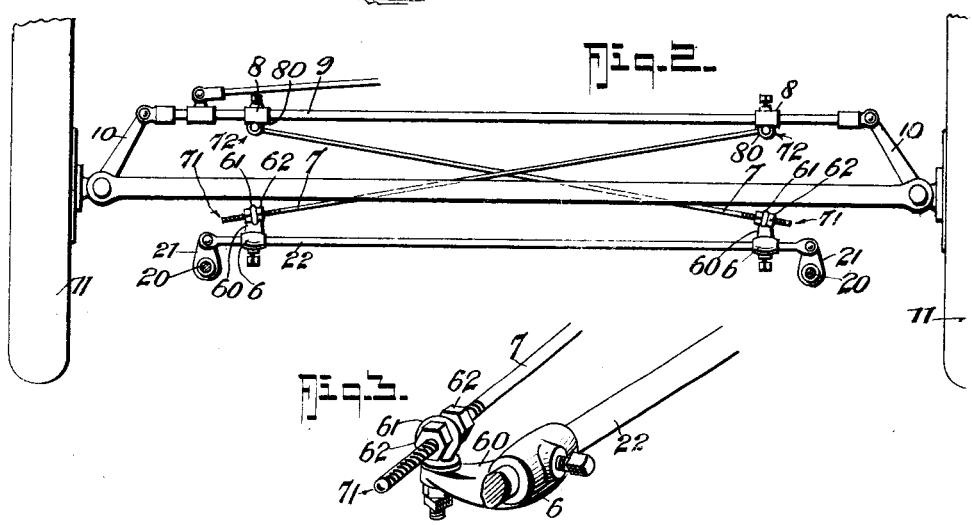
WITNESSES:
John T. Schrott
James Gallagher
INVENTOR
William H. Martin
BY
Fred G. Dieterich & Co.
ATTORNEYS.

UNITED STATES PATENT OFFICE.

WILLIAM H. MARTIN, OF YOUNTVILLE, CALIFORNIA, ASSIGNOR OF ONE-HALF TO HIRAM WILSON, OF YOUNTVILLE, CALIFORNIA.

ADJUSTABLE HEADLIGHT FOR MOTOR-VEHICLES.

1,120,154.     Specification of Letters Patent.     Patented Dec. 8, 1914.

Application filed April 24, 1914. Serial No. 834,176.

*To all whom it may concern:*

Be it known that I, WILLIAM H. MARTIN, a citizen of the United States, residing at Yountville, in the county of Napa and State of California, have invented certain new and useful Improvements in Adjustable Headlights for Motor-Vehicles, of which the following is a specification.

My present invention has reference to adjustable head lights for motor vehicles, and primarily has for its purpose to provide a simple and inexpensive arrangement of parts for connecting the lamp rods or posts with the shifting or connecting rod of the steering mechanism that joins with the knuckles of the opposite steering or front wheels, and in such a manner that a positive or direct shifting action is transmitted to the lamp rods or posts as the connecting rod is shifted, during the operation of directing the front or steering wheels, to thereby cause the lamps to take the same angles of positions that the front wheels assume, through the manipulation of the steering wheel.

Another object of my invention is to provide a simple and inexpensive means, adapted for use on any of the ordinary types of motor vehicles, for automatically effecting the turning of the lamps with the front or steering wheels, and which means may be readily adjusted for effecting a greater or lesser degree of turning of the lamps for causing one lamp to turn at a greater angle than the other, and also for permitting the locking of the lamps to the straight ahead position without necessitating a disconnection of the operative parts.

With other objects in view that will be hereinafter set out, my invention consists in the peculiar combination and novel arrangement of parts, all of which will be hereinafter fully explained, specifically pointed out in the appended claims, and illustrated in the accompanying drawings, in which:—

Figure 1 is a perspective view of my invention, so much of a motor car being shown as is necessary to disclose the operative application of my invention. Fig. 2 is a similar view that illustrates the general arrangement of the connecting devices that join the connecting rod of the steering mechanism with the rod that joins the crank ends of the lamp carrying rod or posts. Figs. 3 and 4 are detail views of parts hereinafter specifically referred to.

In carrying out my invention, the brackets 1, that support the lamp 2 are attached to the front end of the machine in any well known manner, and in the present case they are formed with, or have fixedly attached thereto, the vertical tubular standards 3, in which the rods or posts 20 are mounted.

Lamps 2 are fixedly held upon the upper ends of the rods 20 to oscillate therewith, and the lower end of each of the said rods carries a crank member 21, with which the ends of a connecting rod or bar 22 pivotally join, as shown.

6 designates sleeves adjustably mounted on the cross rod 22 one near each end thereof, and the said sleeves have apertured ears 60 in which the swivel eye bolts 61 are mounted, as is best shown in Fig. 3, by reference to which, and to Fig. 2, it will be also noticed that stout wire rods 7—7 have their ends 71 slidably and adjustably mounted in the swiveled eye bolts 61, and the said ends carry a pair of stop nuts 62, the reason for which will presently appear.

The rods 7—7, it will be noticed, cross each other, and their other ends 72 pivotally connect with the apertured ears 80 of sleeves 8 adjustably mounted on the cross or connecting rod 9 that forms a part of the steering mechanism, since it extends across and is pivotally connected with opposite knuckles 10—10 that carry the front steering wheels 11—11.

From the foregoing taken in connection with the accompanying drawing, the complete construction, the manner in which my invention operates and its advantages will be readily apparent. By reason of arranging the several parts as shown and stated, a very simple and inexpensive means, applicable to almost any of the ordinary styles of auto vehicles, is provided for connecting the lamps with the steering mechanism to cause the lamps to turn with the wheels. Furthermore, my special arrangement of connecting devices for joining the steering mechanism with the lamps, on account of the simplicity and their being readily applied for use, they can be attached to any of the ordinary forms of automobiles irrespective of the position of the steering knuckles. Again, by reason of connecting the transmitting rods 7, to the cross rod 6 in the manner described and best shown in Figs. 3 and 4, the extent of the oscillatory motion of the lamps can be readily regulated by a proper setting or spacing of the set or stop nuts 62, and in cases where it is desired to locate the head lights in a front or straight ahead position, such adjustment of the head lights is provided for since the nuts 62, may be spaced sufficiently far apart (see Fig. 4) to avoid engaging the eye portions of the swivel bolts, the ends of the rods 7 during the last mentioned adjustment, sliding loosely through the said swivel head.

What I claim:—

1. In combination with the knuckle connecting member of the steering mechanism of a vehicle and a plurality of rotatably supported lamp actuating rods, each of which has a crank member; of connections between the said knuckle connecting member and the said lamp actuating rods for turning the said lamps as the aforesaid member is moved, the said connections including a bar whose opposite ends join with the cranks on the said lamp carrying rods, a pair of crossed rods connected at one end to the connecting member of the steering mechanism and whose other ends are swively and slidably connected to the bar that connects the cranks of the lamp carrying rods, and adjustable stops on the said other ends of the cross rods, the said stops being arranged in pairs and one at each side of the swiveled connections.

2. The combination with the steering apparatus of a vehicle in which is included a laterally shiftable member, and a rotatably supported lamp actuating rod having a crank member, of a laterally movable member pivotally connected with the said crank member; a rod having its inner end connected to the laterally shiftable member of the steering apparatus, a sleeve adjustably mounted on the rod connected with the crank member, an eye bolt swively mounted on the said sleeve and in which the outer end of the aforesaid rod is slidably mounted, and stop nuts adjustably mounted on the said outer end of the rod, one at each side of the eye bolt.

3. The combination with the steering apparatus of the vehicle and in which is included a laterally shiftable connecting member and a pair of rotatably supported lamp actuating rods, each of which has a crank member; of adjustable connections between the connecting member of the steering apparatus and the lamp actuating rods, whereby movement may be imparted to the lamps upon the reciprocal movements of the aforesaid connecting member of the steering apparatus, the said means including a bar that pivotally connects at its opposite ends with the cranks of the opposite lamp carrying rods, a pair of sleeves adjustably mounted on the said connecting bar, each of which has an inwardly projected apertured bracket, an eye bolt swively mounted in each of the said brackets, a pair of crossed rods whose inner ends are pivotally and adjustably connected to the connecting member of the steering apparatus, the inner ends of the said rods slidably engaging the eyes of the eye bolts and stop nuts adjustably mounted on the said inner ends of the rods, one at each side of the swiveled eye bolts, substantially as shown.

WILLIAM H. MARTIN.

Witnesses:
 WALTER G. MEYER,
 E. D. HAMPTON.

Copies of this patent may be obtained for five cents each, by addressing the "Commissioner of Patents, Washington, D. C."